Aug. 27, 1968     J. H. WEGGELAND     3,398,912
FILM STRIP CARTRIDGE
Filed May 3, 1965     2 Sheets-Sheet 1
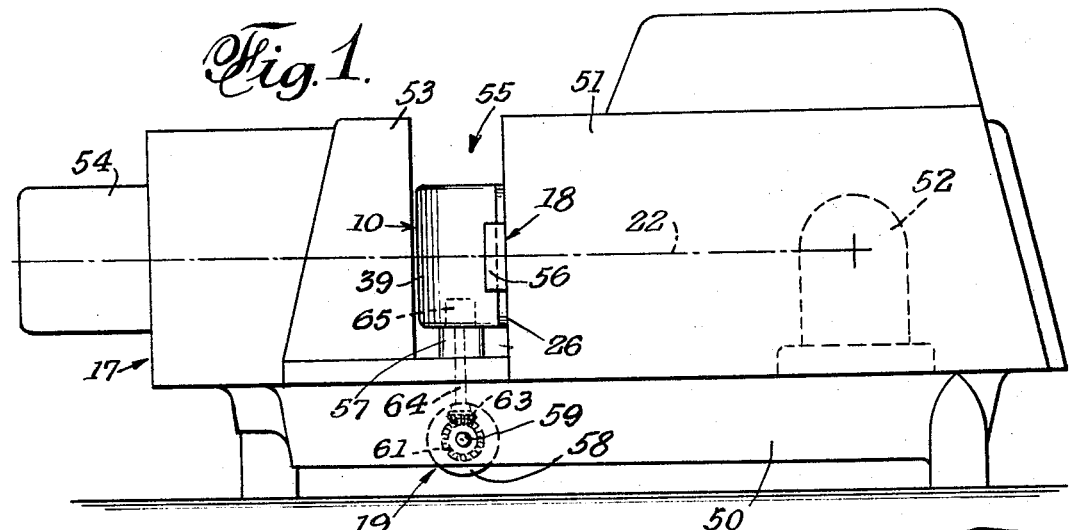
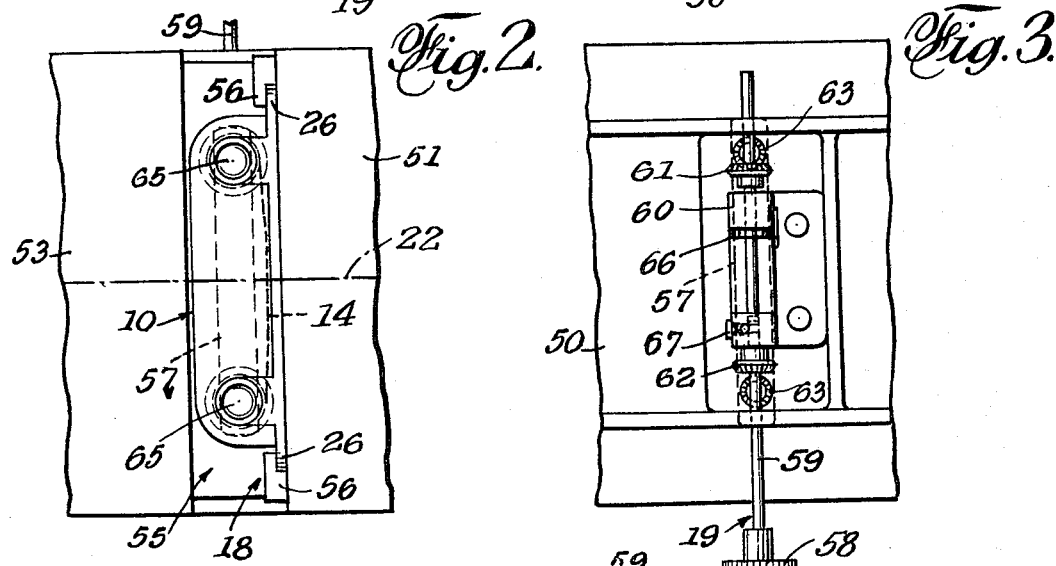
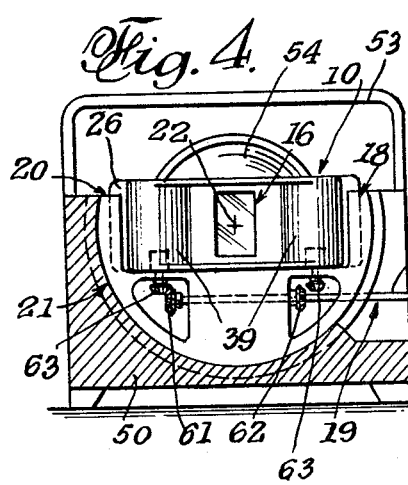
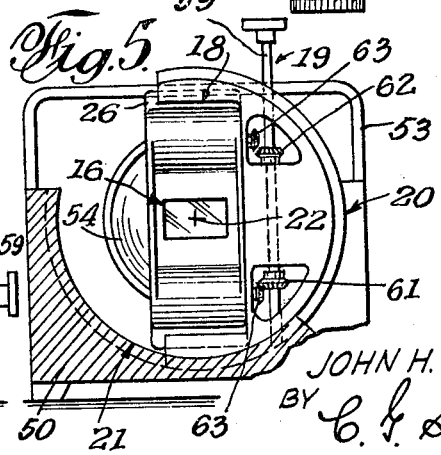
INVENTOR
JOHN H. WEGGELAND
BY C. F. Stratton
ATTORNEY Aug. 27, 1968  J. H. WEGGELAND  3,398,912
FILM STRIP CARTRIDGE
Filed May 3, 1965  2 Sheets-Sheet 2
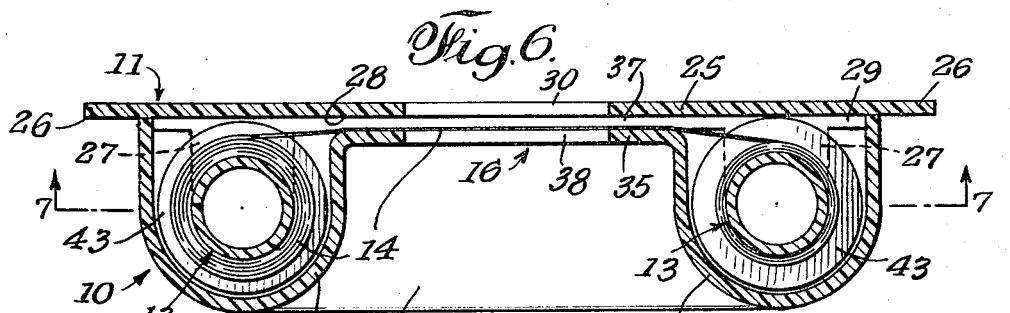
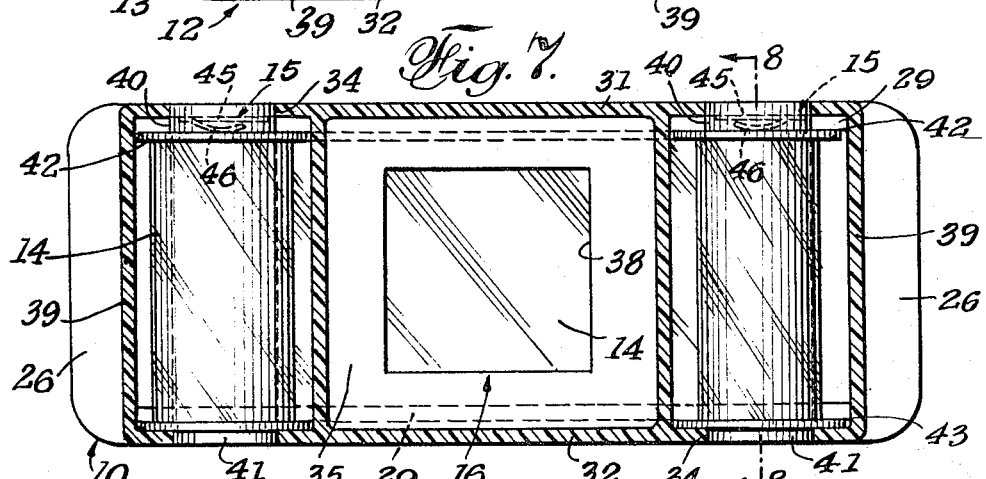
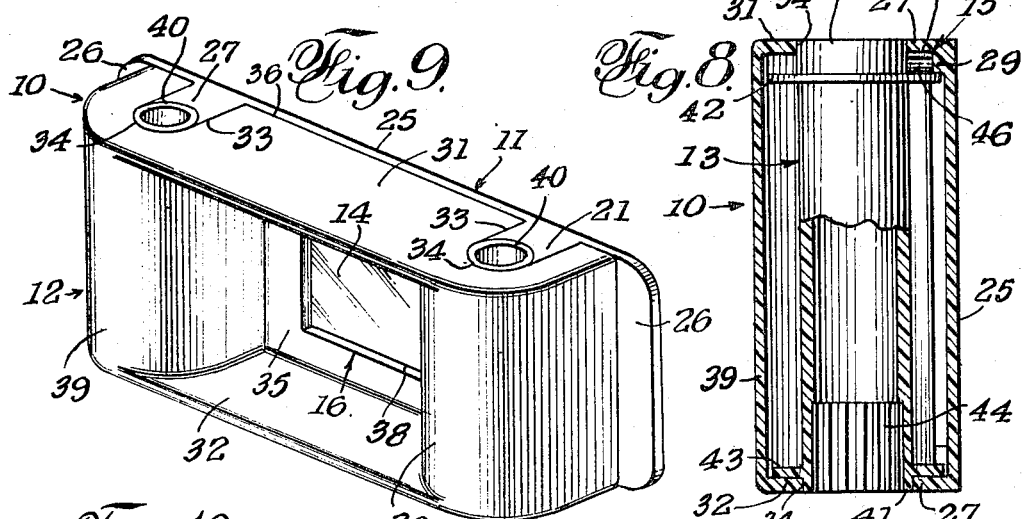
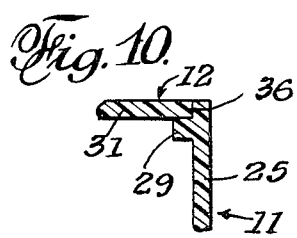
INVENTOR
JOHN H. WEGGELAND
BY C. G. Stratton
ATTORNEY United States Patent Office 3,398,912
Patented Aug. 27, 1968

3,398,912
FILM STRIP CARTRIDGE
John H. Weggeland, Los Angeles, Calif.
(P.O. Box 204, Lehigh Acres, Fla. 33936)
Filed May 3, 1965, Ser. No. 452,942
5 Claims. (Cl. 242—71.2)

ABSTRACT OF THE DISCLOSURE

A cartridge comprising an elongated rectangular housing formed of two interfitting parts having end chambers to house film spools and connected by a portion with a film passage and a light aperture through the passage. The film spools have ends rotationally engaged in the chambers, at least one said end comprising a drive-connecting portion for rotating the spools, selectively. Friction drag means in each chamber engage the spools so as to retain a taut condition of the film wound on the spools as it extends through the film passage. Said cartridge being adapted to be placed in a projector having means to engage and rotate the spools and project the portions of the film exposed by said aperture.

---

This invention relates to a film strip cartridge and to projector means fitted with such a cartridge to project the frames thereof.

The usual film transparencies prepared from a roll of exposed film comprise a separate cardboard mount for each frame or still picture on said film. Therefore, each said mounted transparency of a group thereof is separate from the others, is subject to being disarranged out of sequence, may be inverted and/or reversed with respect to others in the group, become scratched, dirtied and/or finger-printed due to excessive individual handling, as when accidentally dropped, requires one-by-one loading in certain projectors, may fall out of focus or be jammed in the projector or viewer, and may slip in its mount due to faulty mounting by the photo finisher.

An object of the present invention is to provide a film strip cartridge that obviates all of the above enumerated faults of mounted transparencies, and comprises a unitary device in which is housed an exposed and developed film strip of a plurality of frames or pictures and which may be advanced or retracted either manually or by power.

Another object of the invention is to provide a film strip cartridge, as above characterized, that, when placed in a projector designed to receive it, comprises a unitary means for projecting the frames or pictures on the film strip.

Another object of the invention is to provide a novel projector embodying means to control advance or retraction of the film strip.

A further object is to provide such a projector with means to turn the cartridge around the axis of the beam of projecting light to enable projection of frames or pictures that are phased ninety degrees from others in said strip.

This invention also has for its objects to provide such means that are positive in operation, convenient in use, easily installed in a working position and easily disconnected therefrom, economical of manufacture, relatively simple, and of general superiority and serviceability.

The above objects of the invention are realized in a cartridge with spools at each end and a viewing aperture between said spools for passing projection light through the portion of a film strip that is exposed in said aperture and which has its ends wound on said spools. Each spool, as desired, may be turned in a film takeup direction, a light friction drag being imposed on both spools to keep the film spanning between them and exposed in the aperture taut.

An otherwise conventional projector, having a light source and an optical system, provides means to mount such a cartridge so that the aperture thereof is in the light beam between said source and optical system. Manual means that is geared to trunnions that are connected to said cartridge spools, may be manipulated to turn one or the other spool in a takeup direction to insure against unwinding the film on the spool being turned rather, than as desired, winding it so proper film movement is effected. Such a projector may provide a mount for the cartridge that may be turned ninety degrees on the light beam axis to enable orientation of all frames of the film to the same viewing disposition.

The invention also comprises novel details of construction and novel combinations and arrangements of parts, which will more fully appear in the course of the following description and which is based on the accompanying drawings. However, said drawings merely show, and the following description merely describes, preferred embodiments of the present invention. which are given by way of illustration or example only.

In the drawings, like reference characters designate similar parts in the several views.

FIG. 1 is a side elevation view showing a film strip cartridge according to the present invention in operative position in a projector embodying means to feed the film strip in said cartridge in either direction, as desired.

FIG. 2 is a fragmentary top plan view of said cartridge and adjacent portions of the projector.

FIG. 3 is a fragmentary bottom plan view showing the film strip feed means.

FIG. 4 is a cross-sectional view of a projector with means which mounts the cartridge for ninety degrees turning on the axis of the light beam thereof, the view showing said means in one viewing position.

FIG. 5 is a similar view showing the cartridge-mounting means in the other viewing position.

FIG. 6 is an enlarged plan sectional view of the cartridge shown in FIGS. 1 and 4.

FIG. 7 is a vertical sectional view as taken on the line 7—7 of FIG. 6.

FIG. 8 is a vertical sectional view as taken on the line 8—8 of FIG. 7, the film strip being omitted.

FIG. 9 is a smaller scale perspective view of said cartridge.

FIG. 10 is a fragmentary detail section of the cartridge.

The cartridge 10 of the present invention is preferably molded of two cemented plastic parts 11 and 12 to form a generally rectangular housing for two similar spools 13 on which the ends of a film strip 14 are wound to span between said spools across the housing. Friction drag means 15 engage the spools to keep the strip between them taut yet readily wound on either spool depending on the direction of advance of the strip past an aperture 16 in said housing.

The above generally described cartridge is adapted to be removably mounted in a projector 17 of generally conventional form, novel mounting means 18 being provided to hold the cartridge in operative position, and novel drive means 19 being provided to selectively drive either spool of said cartridge in a direction to feed the strip past said aperture 15.

A modification (FIGS. 4 and 5) of the projector provides cartridge mounting means 20 which is rotationally movable in guide means 21 around the axis 22 of a light beam passing through the aperture 16, the drive means 19 being carried by the mounting means 20 in this form of the projector.

Referring more particularly to FIGS. 6 to 9, the part 11 of the cartridge 10 is shown as a generally elongated rectangular plate 25 that, adjacent each end 26, is provided with half-bearing projections 27 that extend normal from the inner face 28 of said plate at the opposite longitudinal edges thereof. Thickened parts 29 along both said edges constitute means to locate the part 12 in vertical register with the part 11, as seen in FIG. 10. A rectangular hole 30, forming part of the aperture 16, is provided centrally of the plate 25.

The part 12 is shown as a rectangular housing of the same height as the plate 25 and of lesser length. On assembly of said parts 11 and 12, the ends 26 of the former form slide tabs. The part 12 is formed to have upper and lower walls 31 and 32 which are provided with recesses 33 into which the half-bearing projections 27 fit to form upper and lower aligned bearings 34 for the spools 13. Said walls 31 and 32 are connected by a vertical wall 35 that is set in from the edges 36 of the walls 31 and 32, thereby forming a film strip passage or space 37 between the parts 11 and 12. Said wall 35 has a rectangular hole 38 that is in register with the hole 30 completing the aperture 16, above mentioned. At each end of the plate 35, the part 12 is formed to have spool chambers 39 that are shown of half-round cross-sectional form, but may be rectangular, if desired, the passage 37 connecting said chambers.

It will be clear that the two parts 11 and 12 may be cemented together so that the part 11 encloses the spool chambers 39 after the spools 13 have been assembled therein with a film strip 14 wound on said spools and spanning between them in the space 37 provided.

Each spool 13 is provided with cylindrical ends 40 and 41 that fit the aligned bearings 34, flanges 42 and 43 on the spools defining the space in which the film 14 is disposed. The spool end 40 is made longer than the end 41 to space the flange 42 from the upper wall 31 of the housing part 12 to provide space for the friction drag means 15. One of the ends of each spool, and both at the same end, is provided with a serrated or similar bore 44, as in FIG. 8, the same comprising a quick connect and release drive connection for turning the spools when the cartridge is placed in a projector 17.

The friction drag means 15, for each spool, is shown as a plate 45 from which is struck a flexible finger 46 that is bowed in a direction to frictionally bear on the flange 42 of each spool. This friction, imposed on both spools, resists free rotation of said spools, thus keeping taut the portion of the film 14 that spans between the portions that are wound on the spools and the wound portions snugly taken up.

The projector 17 is shown with a base 50 that mounts a housing 51 for a light source 52, and with a housing 53 in which an optical system 54 is contained. Between the housings 51 and 53 is provided a space 55.

The cartridge-holding means 18 is shown as slideways 56 that are arranged to engage the end tabs 26 of a cartridge 10 and to dispose said cartridge in said space 55. A block 57 on the base 50 serves as a support for the cartridge, thereby locating the same vertically so that its aperture 16 is centered on the axis 22 of the beam of light that is directed from the light source through the optical system 54. The cartridge-locating means may be embodied in the slideways 56, if desired.

The drive means 19 is shown as a knob 58 (which may be a motor) on a shaft 59 that is rotationally and slidingly mounted in a bearing 60 affixed to the base 50. Two bevel gears 61 and 62 are affixed to said shaft in such spaced relation that only one or the other may be in mesh with driven pinions 63, depending on the endwise position of shaft 59. Each said pinion 63, by a shaft 64 is connected to a trunnion 65 that extends upwardly from the block 57. These trunnions, serrated to be received by the serrated bores 44 of the spools 13, drive said spools.

The drive arrangement is such that the shaft 59 can turn only in one direction, a ratchet device 66 being provided to prevent reverse rotation, and gear 61, when meshed with its pinion 63, providing a film takeup rotation of the spool 13 at one end of the cartridge and is connected to said gear 61, and gear 62, when meshed with its pinion, providing a film takeup rotation of the spool at the opposite end of the cartridge and is connected to said gear 62.

Detent means 67 may be provided to engage grooves in the shaft 57 that are longitudinally spaced to hold the shaft in position to which it is shifted by a pull or push. Thus, the frames or pictures on the film strip may be brought into projection register with the aperture 16 in any sequence or succession desired.

As shown in FIGS. 4 and 5, the cartridge-holding means 18, and therefore, the cartridge, as well as the drive means may be carried by the rotational means 20 that is adjustable in the circular guide 21 centered on the light beam axis 22. This arrangement provides for viewing the subjects of frames that are phased 90° with respect to the subjects in the other frames.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described this invention, what is claimed and desired to be secured by Letters Patent is:

1. A cartridge for exposed strip film that is developed to have transparent pictures comprising a plurality of frames adapted to be projected for viewing thereof, said cartridge comprising:

(a) an elongated, generally rectangular, two-part plastic housing formed of:
  (1) a first part having an elongated rectangular plate with transversely spaced aligned pairs of half-bearing projections that extend normal to the inner face of the plate at the opposite longitudinal edges thereof, said plate, between the pairs of half-bearings, having a film-exposing aperture therein, and
  (2) a second part formed as a rectangular housing of the same height as the plate of the first part and having opposite, parallel walls with pairs of recesses transversely according to the spacing of the pairs of half-bearings, said half-bearings and recesses being interfitted to form aligned pairs of rotational bearings,
  (3) the second part being provided concentrically with each pair of interfitted half-bearings and recesses with wall portions defining spool chambers extending between the opposite parallel walls of said part and enclosed by plate portions of the first part on either side of the aperture thereof, and
  (4) said second part having a wall that is framed by the mentioned opposite parallel walls and the two spool chambers, said latter wall being offset from the edges of the parallel walls and cooperating with the plate of the first part to define a film strip passage that extends between the spool chambers, said offset wall having a film-exposing aperture in register with the aperture of the first part,
(b) a film spool disposed in each said chamber with film-strip-locating flanges thereon and having oppositely directed cylindrical ends that extend oppositely from said flanges and are rotationally fitted in the mentioned aligned pairs of rotational bearings, one spool end of each spool being longer than the other to provide a space between the adjacent flange and bearing,
(c) a film strip with its end wound oppositely on said spools, spanning therebetween in the mentioned strip passage, the spanning portion of the film being exposed through said registered apertures, and (d) friction drag means engaged with each spool and disposed in each said space between the mentioned adjacent flange and bearing to resiliently resist free rotation of the spools, whereby, upon rotation of one spool to wind up the strip thereon, the portion of the strip spanning between the spools becomes tautened as the other spool, under the drag thereagainst, turns to allow the strip to unwind therefrom, accordingly.

2. A cartridge according to claim 1 provided at the ends of the first part with slideway-engageable tabs that extend beyond the spool chambers of the second part.

3. A cartridge according to claim 1 provided with means to locate the two parts in transverse register.

4. A cartridge according to claim 3 in which the latter means comprises thickened portions along both longitudinal edges of the first part directed toward the second part, said latter portions extending partly into the mentioned spool chambers and film passage and in engagement with the inner faces of the opposite parallel walls of said second part.

5. A cartridge according to claim 4 in which cement between the engaged edges and surfaces of the two parts permanently joins said parts and retains the two spools with their ends in engagement in the mentioned rotational bearings.

References Cited
UNITED STATES PATENTS

| | | | |
|---|---|---|---|
| 1,232,125 | 7/1917 | Trippel | 242—71 |
| 1,346,479 | 7/1920 | Bell | 242—55.53 |
| 1,450,446 | 4/1923 | Nelson | 242—55.53 |
| 2,072,625 | 2/1937 | Rose. | |
| 2,384,637 | 9/1945 | Owens | 242—71.2 |
| 2,461,668 | 2/1948 | Thompson | 206—59 X |
| 2,511,383 | 6/1950 | Summers | 242—71.1 |
| 2,721,041 | 10/1955 | Nerwin | 242—71.1 |
| 3,143,050 | 8/1964 | Winkler et al. | 242—71.2 X |
| 3,275,256 | 9/1966 | Campbell et al. | 242—71.8 |

GEORGE F. MAUTZ, *Primary Examiner.*